United States Patent [19]

Reavell et al.

[11] Patent Number: 5,036,307
[45] Date of Patent: Jul. 30, 1991

[54] WEATHER RESISTANT CONTROL SYSTEM FOR SCHOOL BUS SAFETY DEVICE

[75] Inventors: James Reavell; Raymond Heath, both of Campbellford, Canada

[73] Assignee: School Bus Parts Co. of Canada, Inc., Ontario, Canada

[21] Appl. No.: 533,269

[22] Filed: Jun. 4, 1990

[51] Int. Cl.$^5$ .......................... B60Q 1/00; B60Q 1/26; G08B 5/24; E01F 9/10
[52] U.S. Cl. ..................... 340/487; 340/433; 340/480; 340/490; 340/425.5; 116/63 R
[58] Field of Search ............... 340/425.5, 433, 480, 340/487, 488, 489, 490; 116/51, 63 P; 310/39

[56] References Cited

U.S. PATENT DOCUMENTS

| | | |
|---|---|---|
| 2,144,813 | 1/1939 | Roan et al. |
| 3,134,062 | 5/1964 | Held .......................... 310/39 |
| 3,153,398 | 10/1964 | Runkle et al. |
| 4,138,668 | 2/1990 | Latta, Jr. et al. ............ 340/433 |
| 4,315,170 | 2/1982 | Penn ........................... 310/39 |
| 4,559,518 | 12/1985 | Lotta, Jr. .................... 340/130 |
| 4,956,630 | 9/1990 | Wicker ........................ 340/433 |

Primary Examiner—Joseph A. Orsino
Assistant Examiner—Franklin V. Nguyen
Attorney, Agent, or Firm—Caesar, Rivise, Bernstein, Cohen & Pokotilow, Ltd.

[57] ABSTRACT

Apparatus for activating a stop sign on a bus from a retracted to an extended position and vice versa. The apparatus includes a motor coupled, via a rotary-to-reciprocating motion translator, to the stop sign. A rotor is connected to the motor and forms a part of the motion translator. The rotor includes an electrically conductive element at a discrete location on its periphery for sequentially engaging respective ones of a pair of elements located at fixed positions on diametric sides of the rotor. The fixed elements are connected via relays to the motor and an electrical power source to control the operation of the motor so that when the bus door is open the stop sign is extended and when the door is closed the sign is retracted.

17 Claims, 3 Drawing Sheets

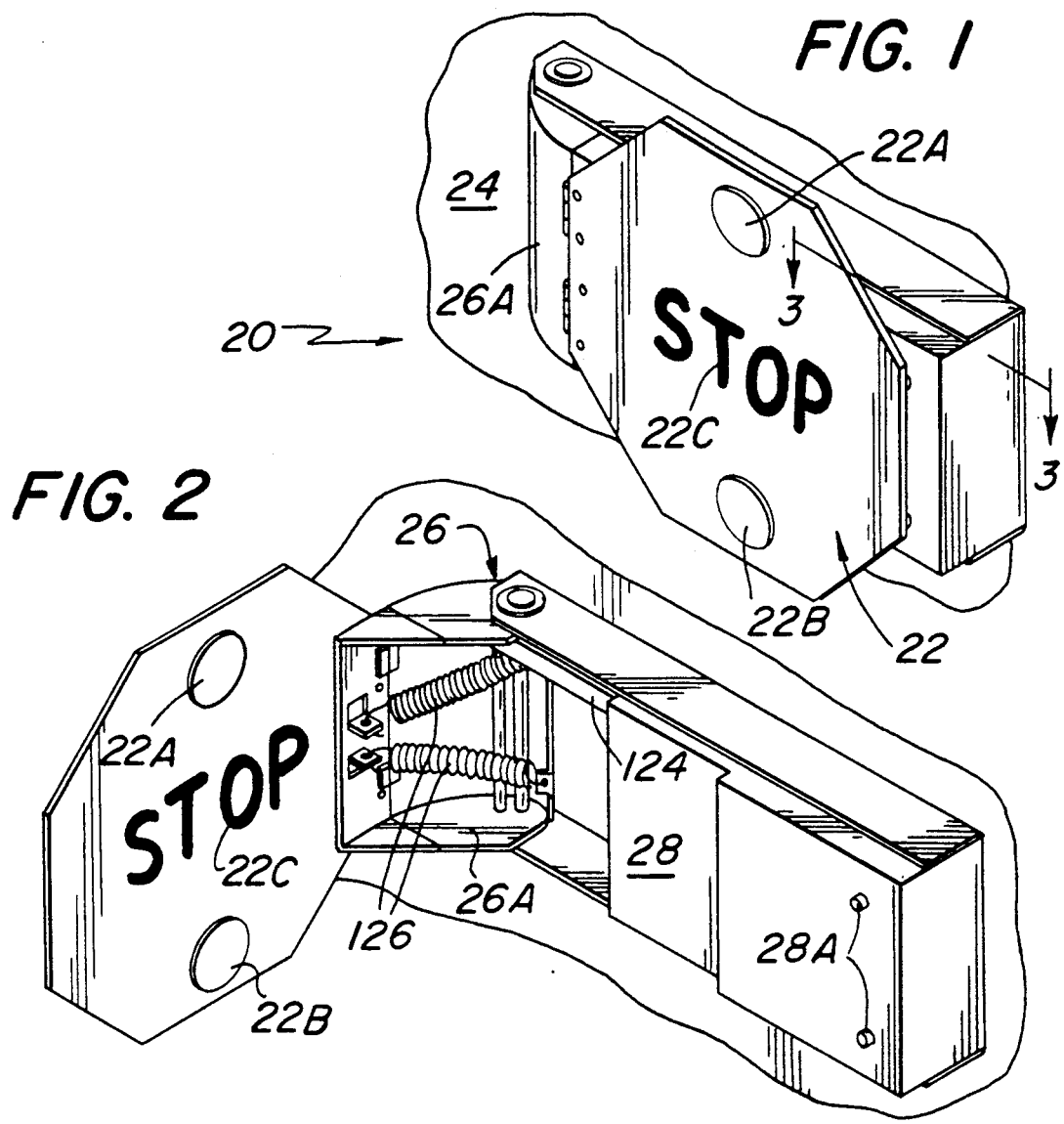
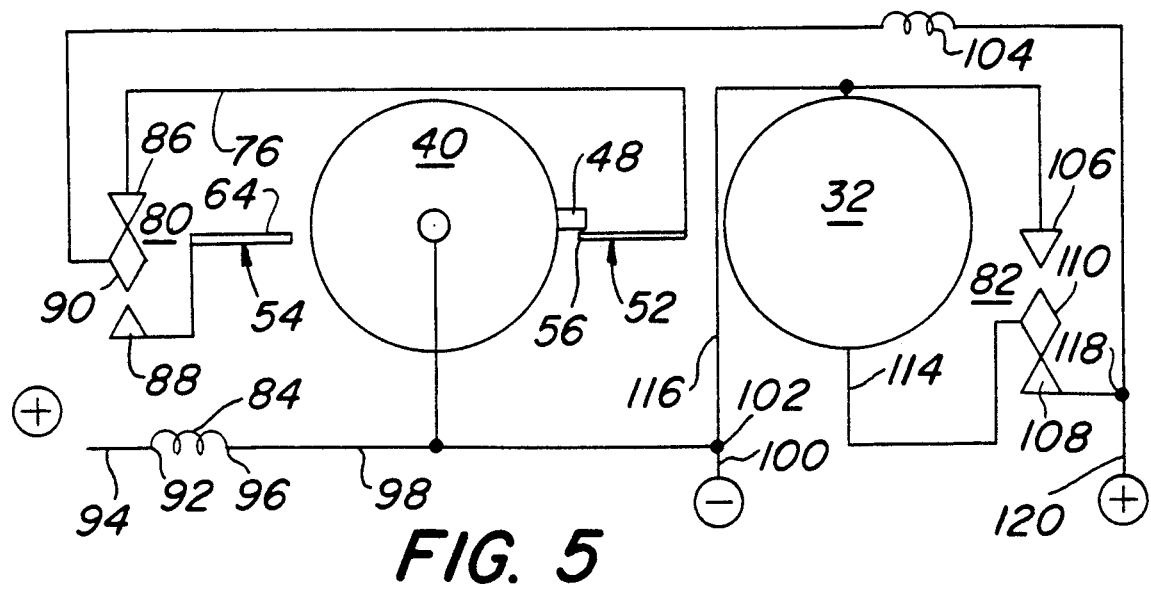

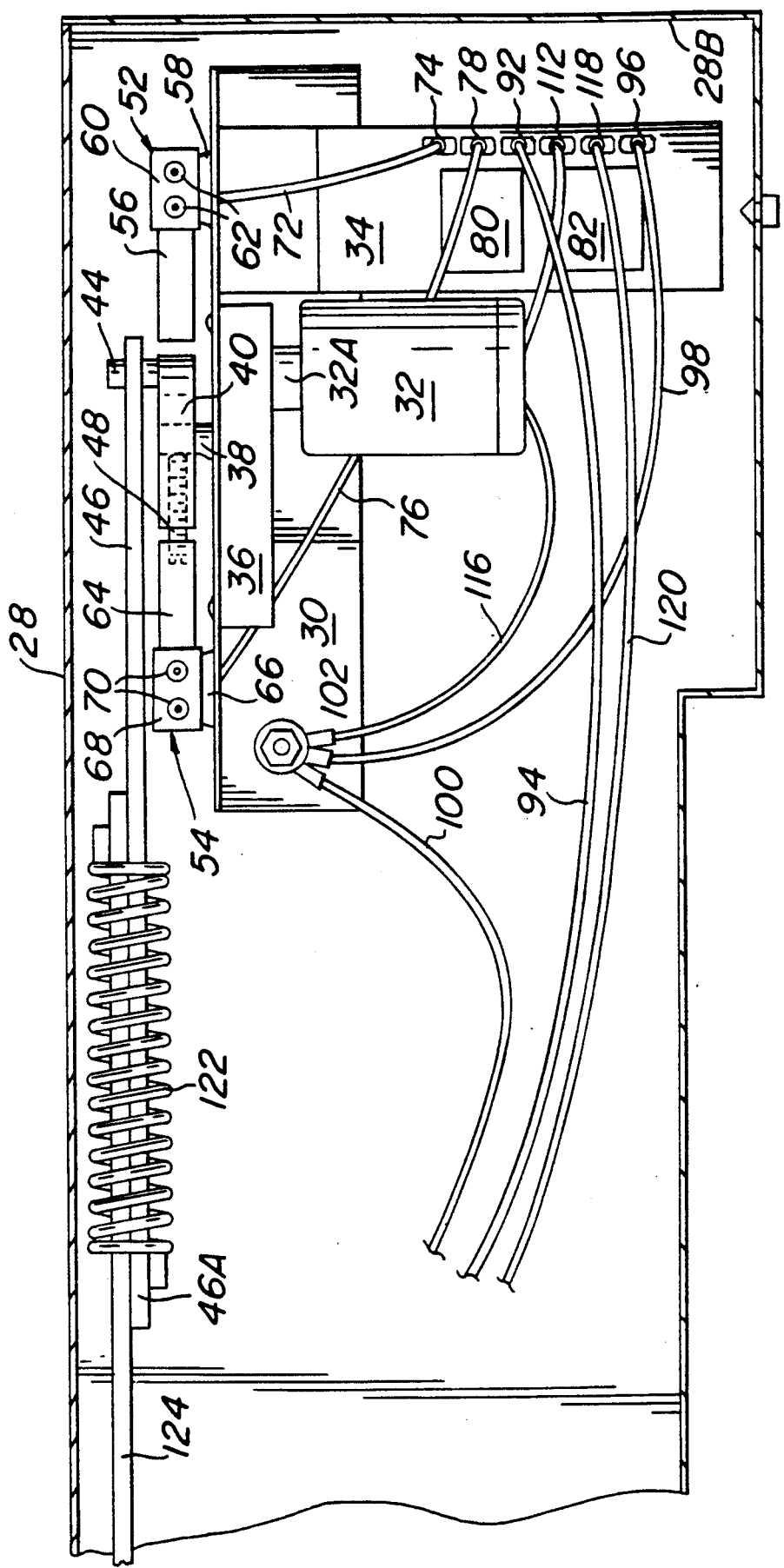

WEATHER RESISTANT CONTROL SYSTEM FOR SCHOOL BUS SAFETY DEVICE

FIELD OF THE INVENTION

The present invention relates generally to safety devices for school buses, and more particularly to a control system therefor which when the door of the bus is opened to unload or load passengers, this causes a stop sign or a crossing arm to swing out, and when the bus door is closed, the sign or arm is then caused to return to its retracted position.

BACKGROUND OF THE INVENTION

School buses have for many years been equipped with a stop sign mechanism under the control of the bus driver, the mechanism acting to swing out the stop sign from its normally retracted position against the side of the bus to an outstretched position to provide a signal alerting drivers of nearby vehicles that children are entering or alighting the bus. U.S. Pat. Nos. 2,384,689 and 3,094,683 are illustrative of manually-operated school bus sign devices, while U.S. Pat. No. 2,252,529 discloses a hydraulically-operated school bus sign.

It is also known to provide motor-operated school bus signs, such apparatus being illustrated in U.S. Pat. Nos. 2,281,717 and 4,138,668. Of greatest prior art interest in this regard is the 1982 U.S. Pat. No. 4,339,744 to Latta, Jr. In this patent, the stop sign mounted on the side of the bus is operated by a unidirectional DC motor and a linkage associated with the sign. This linkage in conjunction with limit switches acts to deploy and retract the stop sign.

Also of prior art interest is the U.S. Pat. No. 4,697,541 to Wicker, wherein a school bus is provided with a crossing arm attached to the front bumpers of the bus for movement between a retracted position alongside the bumper to an extended position projecting outwardly from the bumper to protect children walking in front of the bus.

In U.S. Pat. No. 4,766,413, there is disclosed a system including control circuit and a hinged stop sign for a school bus. That system includes an unidirectional DC motor for driving the stop sign through an eccentric drive and a link arm having associated therewith two normally closed limit switches. In the course of a motor operating cycle, the stop sign swings out to its fully outstretched position, at which point one limit switch is caused to open, and then returns to its retracted position, at which point the other limit switch opens. The limit switches are included in a control circuit which supplies power to the motor.

The control circuit is responsive to a door switch associated with the bus door so that when the door is opened, the door switch is then closed, and power is supplied to the motor through one closed limit switch until the sign reaches its outstretched position, at which point this limit switch opens to cut off the motor. When the door is closed and the door switch is then open, power is supplied to the motor through the other closed limit switch until the sign reaches its retracted position, at which point this limit switch opens to cut off the motor. Thus, the operation of the sign is coordinated with that of the bus door to provide a stop signal when the need therefor arises. Similar limit or microswitch arrangements are included in the control circuits disclosed in the above-identified Latta, Jr., patent.

The use of limit switches in a control system for a school bus safety device has certain practical drawbacks. Such switches are highly sensitive and therefore may respond falsely to vibratory forces. Thus, where the microswitches are associated with a link arm coupled to a stop sign, should the sign vibrate, these vibrations will be transferred to the link arm and cause improper actuation of the switches.

Also, in some safety device control circuits using limit switches, the switches are interposed between the motor and the positive or high side of the power supply. Should either of the limit switches become grounded as a result of a circuit defect, or because of water seepage into the control box mounted on the exterior of the bus, the resultant heavy current flow may overheat the circuit and give rise to a fire. This condition is scarcely conducive to the safety of the children carried by the school bus.

In U.S. Pat. Application Ser. No. 345,188, filed on May 1, 1989, entitled Control System For School Bus Safety Device, there is disclosed a system which overcomes those disadvantages of the prior art. That system comprises a control switch which is caused to close when the bus door is opened and to open when the bus door is closed. Associated with the control switch is a control circuit for connecting a DC power supply to a DC motor operatively coupled through an eccentric drive and a link arm to the safety device, e.g., stop sign, whereby in the course of a single cycle of motor rotation, during one half of the cycle the device is caused to swing out to its fully outstretched position, and during the other half, the device is caused to return to its fully retracted position. The control circuit basically comprises a commutator formed by a conductive rotor mounted on the motor shaft for rotation therewith and having first and second electrically conductive brushes. The brushes act to engage the rotor at diametrically-opposed positions. The rotor has an insulating element at a particular point on its periphery (called the "zero" position).

The motor is connected to the power supply through the control switch and the commutator, such that when the door is opened and the control switch is then closed, the motor is energized through the first brush to swing the device to its fully outstretched position. At this point the first brush is disconnected by the element to shut off the motor. When the door is closed and the control switch is then open, the motor is then energized through the second brush. This action returns the device to its fully retracted position, at which point the second brush is disconnected by the element to shut off the motor.

While the system disclosed in the foregoing patent application is suitable for its intended purposes, it has been found that in some applications, due to prevailing weather conditions, e.g., in cold-damp climates, long term reliability of the system may suffer somewhat. This is caused by surface contamination of the electrically conductive motor.

OBJECTS OF THE INVENTION

Accordingly, it is a general object of this invention to provide a system which overcomes the disadvantages of the prior art.

It is a further object of this invention to provide in a system for actuating a safety device, improved control means, which is resistant to adverse weather conditions.

It is still another object of this invention to provide a control system for use in actuating a safety device which operates efficiently and reliably and which can be constructed at relatively low cost.

SUMMARY OF THE INVENTION

These and other objects of this invention are achieved by providing apparatus for activating a safety device mounted on a vehicle to cause the device to move to an outstretched position when an electrical signal, e.g., a pulse, is provided and to return the device to a retracted position when the electrical pulse is removed. The apparatus comprises a motor having rotatable output means selectably energizable by a DC power source and operatively coupled to the safety device through motion translation means for translating the rotary motion of the output means to reciprocating motion for moving the safety device. In particular, during one half cycle in the course of a single cycle of rotation of the output means the translation means moves the safety device to the outstretched position, and during a second half cycle of the single cycle, the translation means returns the safety device to the retracted position. The apparatus also includes a conductive rotor having a peripheral surface coupled to the rotatable output means for rotation thereby, and an electrically conductive element mounted on the rotor at a discrete localized point on the peripheral surface thereof. The element is electrically coupled to the power source.

First and second electrically conductive members are located adjacent the peripheral surface of the rotor at diametrically opposed positions, with the members being electrically coupled to the power source and arranged to be selectively electrically engaged by the rotor element. Electrical relay means are also provided electrically coupled to the first and second members and the power source and operative to selectively control the energization of the motor from the power source when the rotor element engages the members.

DESCRIPTION OF DRAWINGS

For a better understanding of the invention as well as other objects and further features thereof, reference is made to the following detailed description to be read in conjunction with the accompanying drawings-, wherein:

FIG. 1 is a front, isometric view of a stop sign control apparatus for use on a school bus, or some other vehicle, and showing the stop sign is in its retracted position;

FIG. 2 is a view similar to that of FIG. 1 and showing the stop sign in its outstretched position;

FIG. 3 is a top plan view of the case of the apparatus opened to show the bracket on which the motor and the relay of the apparatus is mounted;

FIG. 5 is a schematic circuit diagram of the control system for the apparatus.

DETAILED DESCRIPTION OF THE PREFERRED EMBODIMENT

Figure 4:
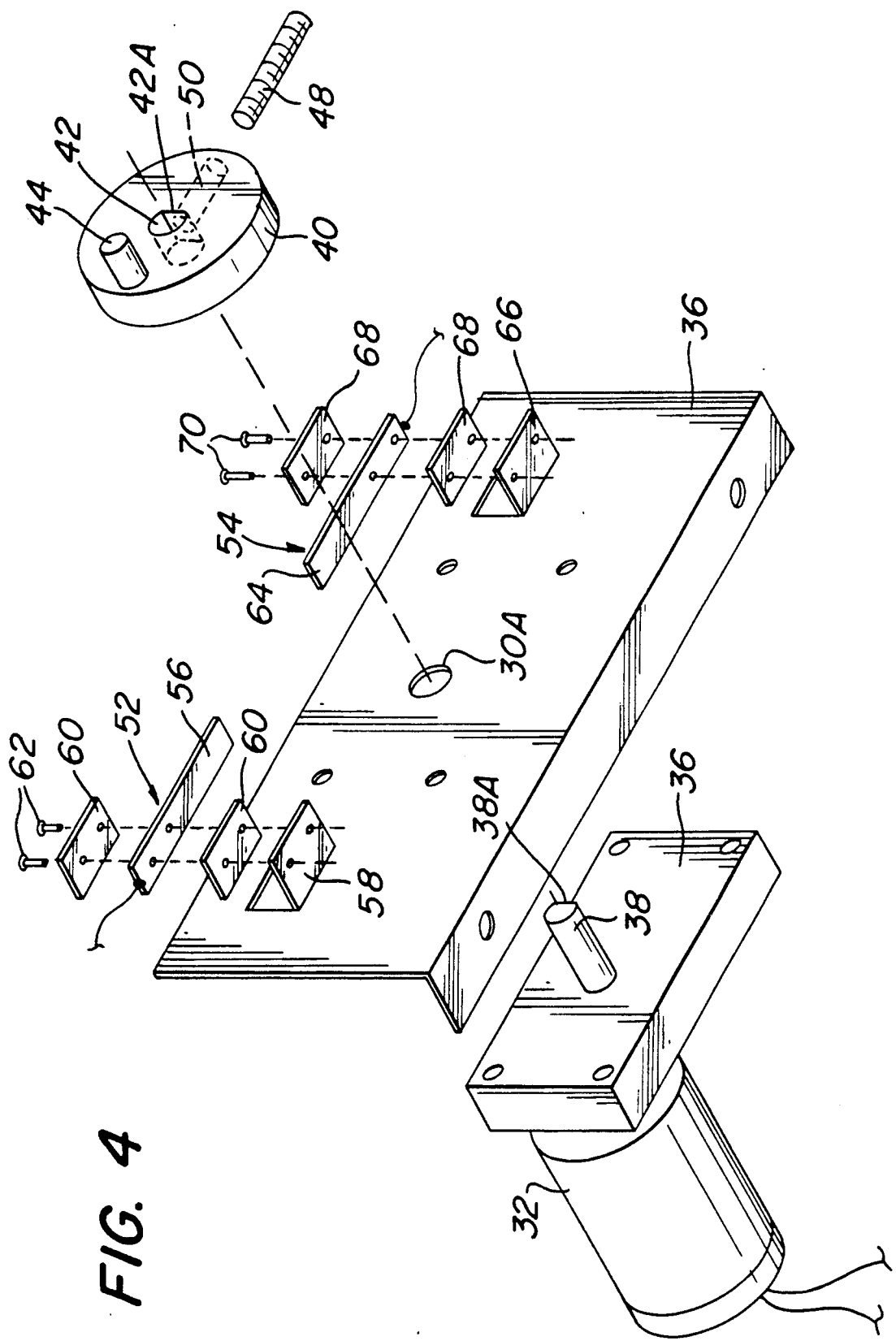
FIG. 4 is an exploded isometric view of a portion of the components of the apparatus shown in FIG. 3.

Referring now to FIG. 1, there is shown a bus stop sign control apparatus 20 constructed in accordance with this invention. That apparatus is arranged for swinging a stop sign 22 from a retracted position where it is located against the side 24 of a school bus or any other vehicle on which the apparatus 20 is mounted, to an outstretched position as shown in FIG. 2. The stop sign 22 in the preferred embodiment shown herein is in the form of a conventional octagonal plate and includes a pair of flasher lights 22A and 22B, respectively, mounted above and below the indicia 22C stating the word "STOP". The sign 22 is bolted onto one portion 26A of a hinge mechanism 26 of the apparatus. The apparatus, itself, is supported, in a box-like casing or housing 28 which is mounted via fasteners onto the side 24 of the bus. The housing includes a pair of rubber bumpers 28A against which the stop sign 22 is held when it is in the retracted position.

In operation, when the door (not shown) of the bus is opened to load or unload passengers, the apparatus causes stop sign 22 to swing out until it reaches the fully outstretched position as shown in FIG. 2. In this position it is clearly visible from both front and back to serve to alert nearby vehicles. At the same time, the lights 22A and 22B on the sign are caused to flash periodically to provide a highly visible warning to the drivers of nearby vehicles. These flashing lights appear on both sides of the sign. In addition, front and rear lights (not shown) on the bus may be caused to flash.

As shown in FIGS. 3 and 4, mounted within apparatus casing 28 adjacent the rear end 28B thereof is a bracket 30 on which is supported a unidirectional DC gear motor 32 and an electrical relay board 34. A gear reduction unit 36 is mounted on the motor and connected to the motor's output shaft 32A. The unit 36 includes its own output shaft 38. The output shaft of the gear unit 36 is laterally offset from the motor's output shaft 32A. The shaft 38 includes a flat 38A and extends through a hole 30A (FIG. 4) in the bracket 30. A rotor element 40 is keyed to the output shaft 38 and forms a portion of motion translation assembly. That assembly is arranged to convert the rotational motion of output shaft 38 into reciprocating linear motion to move the stop sign between its retracted and extended positions and vice versa.

The rotor element 40 is a disk-like member having a central opening 42 including a flat 42A and which is adapted to receive the flatted output shaft 38A of the gear reduction unit. A pin 44 extends outward from the front surface of the rotor element 40 and is located radially offset from the center of the rotor. The pin 44 is cylindrical in shape and extends through a circular opening (not shown) in one end of a link arm 46 (FIG. 3). The arm 46 forms another part of the motion translation assembly and is an elongated member which extends in a longitudinal direction down the housing 28 and is coupled by mechanical overload means (to be described in detail later) to the hinge mechanism 26 to cause the extension and retraction of the stop sign 22 as the rotor 40 is rotated by the motor 32.

In particular, when the motor 32 operated is rotated, the resultant rotation of the eccentric pin 44 about the central axis of the rotor, causes the link arm 46 to undergo a forward stroke to the left and then a return stroke to the right in the course of each full cycle of operation of the motor. The link arm 46 is coupled by the mechanical overload means to the hinge mechanism 26 of the stop sign 22 so that in the course of the forward stroke the hinge member 26A and hence the stop sign 22 is caused to swing out until it occupies a fully outstretched position, and in the course of the return stroke of the link arm, the stop sign returns to its fully retracted position. In the embodiment of the apparatus shown herein, the forward stroke is completed in the first half cycle of motor rotation, and the return stroke in the next half cycle.

The motor 40 also serves as a portion of an electrical control assembly which operates to govern the operation of the motor, i.e., when the motor is to be turned on or off, depending upon the position of the vehicle's door. In particular, the rotor 40 includes an electrically conductive element 48 which is arranged to cooperate with a pair of electrical members 52 and 54 to effect the stopping and starting of the motor 32 as a function of the position of the bus' door. The element 48 is in the form of a set screw disposed within a bore 50 which extends radially into the peripheral edge of the rotor. The element 48 is mounted within the bore 50 so that a free end portion extends ( radially outward from the rotor's periphery. The element 48 is formed of an electrically conductive material and is electrically connected, via rotor means (not shown) at the rotor mounting shaft 38, to a negative or ground terminal (to be described later) of the apparatus 20.

The members 52 and 54 are shown clearly in FIGS. 3, 4 and 5. Thus, as can be seen therein the member 52 comprises an electrically conductive element 56 which is mounted on a tab 58 projecting from the motor mounting bracket 30. The member 56 is mounted on tab 58 between a pair of electrically insulative isolating blocks 60, via a pair of fasteners 62. The tab 58 is formed by bending a portion of the bracket 30 perpendicularly out of the plane thereof as shown clearly in FIG. 4. With the element 56 mounted as just described, it extends radially inward toward the center of the rotor 40, with the free end of the element located closely adjacent the periphery of the rotor. The free end of the element 56 is arranged to be engaged by the extending portion of the rotor element 48 when the rotor 40 is in what is referred to as the "zero" position, that is, when the extending portion of rotor element 48 is rotated to the position of the element 52. The element 54 is of identical construction to element 52 and thus includes an element 64 mounted on a tab 66 between a pair of electrically isolated blocks 68 via plural fasteners 70. The element 64 is located diametrically opposed from element 52 and its free end is located closely adjacent the periphery of the rotor 40 so that it is arranged to be engaged by the rotor element 48 when the rotor is rotated so that the element is opposite to it.

As can be seen clearly in FIGS. 3 and 5, the element 56 of the first element 52 is electrically connected, via a conductor wire 72, to one terminal 74 of the relay board 34. In a similar manner, the element 64 of the second element 54 is electrically connected, via a conductor wire 76, to another terminal 78 of the relay board 34. The relay board 34 includes a pair of electrically operated relays 80 and 82.

Referring now to FIG. 5, the relay 80 can be seen to comprise a relay coil 84, a pair of stationary electrical contacts 86 and 88 and a movable electrical contactor 90. When the relay 80 is not actuated, that is the coil 84 not energized, the stationary contact 88 and the moving contact 90 are separated so as to be normally open, whereas the movable contact 90 engages the stationary contact 86 so as to be normally closed. One side of the relay coil 84 is connected, via terminal 92 (FIG. 3) and an associated conductor wire 94, to means (not shown) for providing a positive signal pulse (designated by the "plus" symbol in FIG. 5) when the bus door is opened. The other side of the relay coil 84 is connected, via relay terminal 96 and associated conductor wire 98 to ground (with "ground" being designated by the "negative" symbol in FIG. 5). The ground for the system 20 is provided via an electrical conductor 100 from a secure ground in the vehicle to a terminal 102 on the bracket 30. The conductor 98 is also electrically connected secured to the bracket 30 via terminal 102.

The relay 82 basically comprises a coil 104, a first stationary electrical contact 106, a second stationary electrical contact 108 and a movable electrical contactor 110. The relay 82 is arranged so that when it is in its normal state, that is its coil is not energized, the movable electrical contactor 110 electrically engages the stationary contact 108 to be normally closed, whereas the contactor 110 and the stationary contact 106 are separated so as to be normally open. The movable contactor 110 is electrically connected, via a terminal 112 on the circuit board 34 and an associated connected wire 114, to the terminal side of the motor 32. The other terminal of the motor is connected, via an electrical conductor 116 and the terminal 102, to ground. The stationary contact 106 is connected to ground via conductor 116. The other stationary contact 108 is connected, via a terminal 118 and an electrical conductor 120, to a master switch (not shown) or some positive voltage source of the vehicle, e.g., the positive battery post. One side of the relay coil 104 of relay 82 is electrically connected to the terminal 118 and the other side thereof is electrically connected to the movable contactor 90 of the relay 80.

Operation of the apparatus 20 will now be described with reference to FIG. 5. Thus, when power is supplied to apparatus 20 the relay coil 104 of relay 82 is energized from the positive voltage source connected to line 120 via the path including the movable contactor 90 which is in engagement with stationary contact 86 of the normally closed elements of relay 80, the conductor wire 76, the element 56 which is in engagement with the movable rotor element 48 of the rotor (the rotor being at the "zero position" at this time), the conductor 98, terminal 102, and ground. The energization of relay coil 104 opens its normally closed contacts and closes its normally open contacts, thereby deenergizing the motor 32.

When the bus door (not shown) is opened a pulse is provided via line 94 from means (not shown). Such means may operate in automatic response to the opening of the bus door or may be manually operated by the bus driver as discussed later. In any event the pulse causes relay 80, and its coil 84, to be energized (one side of the relay coil is provided with the positive pulse, whereas the other side of the relay coil is connected to ground). When relay 80 energizes its normally closed contacts 86 and 90 open, thereby deenergizing relay coil 104, whereupon the relay 82 drops out so that its normally closed contacts 108 and 110 close. This action effects the energization of the motor 32 from the positive source via the path consisting of the conductor wire 120, closed contacts 108 and 110, conductor wire 114, the motor, and conductor wire 116 back to the grounded terminal 102.

The energization of the motor 32 causes its output shaft to begin rotating and it continues to do so, thereby rotating the rotor 40 until its radially extending rotor element 48 engages element 54. This action causes relay coil 104 to be reenergized again, this time from the positive source through the path consisting of the conductor 120, the now closed contacts 88 and 90 of relay 82, the movable rotor element 48 (which is now in electrical engagement with the element 54), and the conductor wire 98 to the ground terminal 102. Once the relay 82 is energized, its normally open contacts 106 and 110 close to deenergize the motor 32. At this time the stop sign 22 will be in the extended position shown in FIG. 2.

When the bus door is closed again the pulse signal appearing via conductor 94 is removed so that the relay coil 84 of relay 80 is again deenergized. This action causes the normally open (but now closed contacts 88 and 90) to open and its normally closed (but now opened contacts 86 and 90) to close again, whereupon the relay coil 104 is again energized. The energization of relay coil 104 causes the normally closed contacts 108 and 110 of relay 82 to close, whereupon the motor again commences rotation. The rotation of the motor continues until the movable element 48 on the rotor 40 is again at the "zero" position, wherein it engages the element 52. At this time the relay coil 104 of relay 82 is again energized from the positive source via the path including the terminal 118, the relay coil 104, the normally closed contacts 86 and 90 of relay 80, the engagement of the element 52 with the movable rotor element 48, and the ground terminal 102. This action stops the motor so that the stop sign is fully retracted as shown in FIG. 1.

As can be seen clearly in FIG. 3, the free end 46A of the link arm 46 is connected via a helical compression spring 122 to one end of another elongated, link arm 124. The link arm 124 also forms a portion of the motion translation assembly and extends down the length of the housing 28 and is connected to the hinge portion 26A. The hinge portion 26A is normally biased in the retracted position by a pair of helical, tension, springs connected between the housing 28 and hinge portion 26A.

The compression spring 122 connected between the link arms 46 and 124 is pre-loaded and serves to safeguard the apparatus against overload on the electrical or mechanical system if an unauthorized attempt is made when the stop sign 22 is in its outstretched position to manually force it to its retracted position. In this regard such action will cause the safety spring 122 to stretch, permitting the movement of the stop sign without affecting the relationship of the link arm 46 to the motor 32 or to the elements 52 and 54.

As should be appreciated from the foregoing, if the apparatus makes use of automatic means to provide the positive pulse signal on line 94 the driver of the bus need not take any separate action to swing out or retract the stop sign 22. In this regard, the operation of the stop sign is automatically coordinated with the opening and closing of the bus door. The motor control circuit is linked to a flasher unit for the bus lights and for lights in the stop sign in the manner described in the Latta, Jr., et al. patent, or by any other suitable circuit means, so that whenever the stop sign is fully outstretched, the flasher unit is then actuated.

While there has been shown and described the preferred embodiment of the school bus stop sign apparatus constructed in accordance with this invention, it will appreciated that many changes and modifications may be made therein without departing from the teachings of this invention. Thus, while it is desirable to provide a door switch or other means to automatically provide the signal to control the operation of the stop sign, in practice one may use a driver-operated manual switch (not shown) for this purpose.

Also, the apparatus 20 of this invention can be used for traffic control purposes other than that provided by a stop sign. Thus, a guard rail may be mounted on the hinge mechanism and may be causing you to swing out to an outstretched position to arrest the flow of traffic or to be moved back to the retracted position to permit such flow under the control of the apparatus 20.

Without further elaboration the foregoing will so fully illustrate our invention that others may, by applying current or future knowledge, adopt the same for use under various conditions of service.

We claim:

1. Apparatus for activating a safety device mounted on a vehicle to cause the device to move to an extended position when a first electrical signal is provided and to return the device to a retracted position when a second electrical signal is provided, said apparatus comprising:
   (a) a motor having rotatable output means selectably energizable by a DC power source and operatively coupled to the safety device through motion translation means for translating the rotary motion of said output means to reciprocating motion for moving said safety device, whereby during one half cycle in the course of a single cycle of rotation of said output means said translation means moves the safety device to said extended position, and during a second half cycle of said single cycle, said translation means returns said safety device to said retracted position;
   (b) a rotor having a peripheral surface coupled to said rotatable output means for rotation thereby;
   (c) an electrically conductive rotor element mounted on said rotor at a discrete localized point on said peripheral surface and electrically coupled to said power source;
   (d) first and second electrically conductive elements located adjacent said peripheral surface of said rotor at diametrically opposed positions, said first and second electrically conductive elements being electrically coupled to said power source and arranged to be selectively electrically engaged by said rotor element;
   (e) electrical relay means electrically coupled to said first and second electrically conductive elements and said power source and operative to selectively control the energization of said motor from said power source when said rotor element electrically engages said elements.

2. The apparatus of claim 1 wherein said vehicle is a bus having a door and wherein said first electrical signal comprises a pulse which is provided when said door is opened, whereupon said relay means operates to effect the energization of said motor from said power source to cause said motion translation means to move said safety device to said extended position and to rotate said rotor to the position wherein said rotor element engages said first electrically conductive element, whereupon said relay means operates to deenergize said motor so that its output means stops rotating.

3. The apparatus of claim 2 wherein said pulse is removed when said door is closed, whereupon said relay means operates to effect the energization of said motor from said power source to cause said motion translation means to move said safety device back to said retracted position and to rotate said rotor to the position wherein said rotor element engages said second electrically conductive element, whereupon said relay means operates to deenergize said motor so that its output means stops rotating.

4. The apparatus of claim 3 wherein said relay means comprises first and second relays, said second relay being electrically connected to said motor to energize said motor from said power source when said second relay is in one state and to deenergize said motor when said second relay is in a second state, said first relay being coupled to said first and second electrically conductive elements and operative in response to the engagement of said rotor element with a selected one of said first and second electrically conductive elements to cause said second relay means to be in either said first or said second states.

5. The apparatus of claim 4 wherein said first relay comprises a first coil, a pair of stationary electrical contacts and a first movable electrical contact coupled thereto and movable in response to the energization of said first coil for selectively engaging said stationary electrical contacts of said first relay means, each of said stationary electrical contacts of said first relay means being electrically connected to a respective one of said first and second electrically conductive elements, said second relay comprising a second coil, a pair of stationary electrical contacts and a second movable electrical contact coupled thereto and movable in response to the energization of said second coil for selectively engaging said stationary electrical contacts of said second relay means, said motor being electrically connected between said second contact and one of said stationary contacts of said second relay means.

6. The apparatus of claim 5 wherein one side of said second relay coil is electrically connected to a first polarity side of said power source, wherein the other side of said second relay coil is electrically connected to said first movable contact of said first relay means, wherein one side of said first relay coil is electrically connected to said rotor element, to a second, opposite, polarity side of said power source, and to one terminal of said motor, and wherein said other side of said first relay coil is connected to means on which said electrical pulse appears.

7. The apparatus of claim 6 wherein said second contact of said second relay means is electrically connected to one side of said motor, wherein one of said stationary contacts of said second relay means is electrically connected to the other side of said motor and to said second opposite, polarity side of said source, and wherein the other of said stationary contacts of said second relay means is electrically connected to said first polarity side of said power source.

8. The apparatus of claim 7 wherein said electrical pulse is the same polarity as the polarity of said first polarity side of said power source, and wherein said second electrical pulse is the same polarity as the polarity of said second polarity side of said power source.

9. The apparatus of claim 8 wherein said second polarity side of said power source is the bus' ground.

10. The apparatus of claim 1, wherein said safety device is a sign hingedly mounted on a side of said bus.

11. The apparatus of claim 10 wherein said motion translation means comprises a pin mounted on said rotor and offset from the center of rotation thereof, said pin being received within an opening adjacent one end of an elongated link arm, the other end of said link arm being coupled to a hinge mechanism, said sign being connected to said hinge mechanism.

12. The apparatus of claim 11 additionally comprising force take-up means connected between said link arm and said hinge mechanism to enable the sign to be manually moved when in said extended position without affecting said motion translation means or said first and second elements.

13. The apparatus of claim 12 wherein said take-up means comprises a spring.

14. The apparatus of claim 3, wherein said safety device is a sign hingedly mounted on a side of said bus.

15. The apparatus of claim 14 wherein said motion translation means comprises a pin mounted on said rotor and offset from the center of rotation thereof, said pin being received within an opening adjacent one end of an elongated link arm, the other end of said link arm being coupled to a hinge mechanism, said sign being connected to said hinge mechanism.

16. The apparatus of claim 15 additionally comprising force take-up means connected between said link arm and said hinge mechanism to enable the sign to be manually moved when in said extended position without affecting said motion translation means or said first and second elements.

17. The apparatus of claim 16 wherein said take-up means comprises a spring.

* * * * *